(12) United States Patent
Hari (10) Patent No.: US 10,079,694 B2
(45) Date of Patent: Sep. 18, 2018

(54) SCALABLE VIRTUAL NETWORKS IN SDN-BASED ETHERNET NETWORKS USING VLANS

(71) Applicant: ALCATEL-LUCENT USA, INC., Murray Hill, NJ (US)

(72) Inventor: Adiseshu Hari, Holmdel, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 134 days.

(21) Appl. No.: 14/473,106

(22) Filed: Aug. 29, 2014

(65) Prior Publication Data

US 2016/0065386 A1 Mar. 3, 2016

(51) Int. Cl.
*H04L 12/46* (2006.01)
*H04L 12/24* (2006.01)

(52) U.S. Cl.
CPC ...... *H04L 12/4679* (2013.01); *H04L 12/4633* (2013.01); *H04L 12/4645* (2013.01); *H04L 41/0809* (2013.01); *H04L 41/0886* (2013.01); *H04L 41/12* (2013.01); *H04L 41/0893* (2013.01)

(58) Field of Classification Search
CPC . H04L 12/4679; H04L 41/0803; H04L 41/12; G06F 9/455
See application file for complete search history.

(56) References Cited

U.S. PATENT DOCUMENTS

| 8,867,361 | B2* | 10/2014 | Kempf | H04W 24/02 370/216 |
| 2003/0123453 | A1* | 7/2003 | Ooghe | H04L 12/1886 370/395.53 |
| 2009/0141731 | A1* | 6/2009 | Bitar | H04L 12/5695 370/412 |
| 2013/0111036 | A1* | 5/2013 | Ozawa | H04L 41/0893 709/226 |
| 2013/0125230 | A1* | 5/2013 | Koponen | H04L 41/0823 726/13 |
| 2013/0254412 | A1* | 9/2013 | Menezes | H04L 43/026 709/228 |
| 2013/0283263 | A1* | 10/2013 | Elemary | G06F 9/45558 718/1 |

(Continued)

*Primary Examiner* — David Oveissi
(74) *Attorney, Agent, or Firm* — Kramer Amado, P.C.

(57) ABSTRACT

Various embodiments relate to a method, device, and machine-readable storage medium including: instructions for receiving a configuration request from an edge device, wherein the configuration request identifies a traffic flow between at least two end devices other than the edge device; instructions for assigning a virtual local area network (VLAN) identifier to the traffic flow; instructions for configuring the edge device to add the assigned VLAN identifier to outgoing frames associated with the traffic flow, wherein the outgoing frames are frames that will be transmitted by the edge device to a core network. Various embodiments additionally include instructions for configuring, in response to assigning the VLAN identifier, at least one additional edge device to remove the VLAN identifier from incoming frames associated with the traffic flow, wherein the incoming frames are frames that have traversed at least one core node of the core network.

27 Claims, 8 Drawing Sheets

(56) References Cited

U.S. PATENT DOCUMENTS

| | | | | |
|---|---|---|---|---|
| 2013/0297768 A1* | 11/2013 | Singh | ............... | H04L 12/2602 709/224 |
| 2014/0280838 A1* | 9/2014 | Finn | ............... | H04L 49/00 709/223 |
| 2014/0281534 A1* | 9/2014 | McCormack | ....... | H04L 63/0428 713/168 |
| 2015/0271169 A1* | 9/2015 | Seligson | ............ | H04L 63/0892 726/4 |
| 2015/0282026 A1* | 10/2015 | Gupta | ............... | H04W 72/042 370/331 |
| 2015/0341329 A1* | 11/2015 | Mosko | ............... | H04L 63/08 726/3 |
| 2016/0205071 A1* | 7/2016 | Cooper | ............... | H04L 12/6418 726/1 |

\* cited by examiner

VLAN A

VLAN B

VLAN C

VLAN D

SCALABLE VIRTUAL NETWORKS IN SDN-BASED ETHERNET NETWORKS USING VLANS

TECHNICAL FIELD

Various exemplary embodiments disclosed herein relate generally to network configuration and, more particularly but not exclusively, to software-defined networks and cloud computing.

BACKGROUND

Virtual local area networks (VLANs) have been utilized for decades to extending private networks across geographical distances using the Internet while still providing isolation of network traffic from other Internet traffic. As cloud-based applications become more widespread, VLANs are a natural choice for enabling communication between geographically diverse virtual machines that nonetheless belong to the same cloud tenant and application. Native VLAN support, however, only provides for the establishment of 4,096 different VLANs within a network. In cloud-based networks, where the number of potential tenants can number in the tens or hundreds of thousands, this limit generally renders native VLAN usage insufficient.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a non-transitory machine-readable storage medium encoded with instructions for execution by a software-defined network (SDN) controller, the medium including: instructions for receiving a configuration request from an edge device, wherein the configuration request identifies a traffic flow between at least two end devices other than the edge device; instructions for assigning a virtual local area network (VLAN) identifier to the traffic flow; instructions for configuring the edge device to add the assigned VLAN identifier to outgoing frames associated with the traffic flow, wherein the outgoing frames are frames that will be transmitted by the edge device to a core network.

Various embodiments described herein relate to a software-defined network controller including: a network interface; a memory; and a processor in communication with the network interface and the memory, the processor being configured to: receive, via the network interface, a configuration request from an edge device, wherein the configuration request identifies a traffic flow between at least two end devices other than the edge device, assign a virtual local area network (VLAN) identifier to the traffic flow, and configure the edge device to add the assigned VLAN identifier to outgoing frames associated with the traffic flow, wherein the outgoing frames are frames that will be transmitted to a core network.

Various embodiments described herein relate to a method performed by a software-defined network controller, the method including: receiving a configuration request from an edge device, wherein the configuration request identifies a traffic flow between at least two end devices other than the edge device; instructions for assigning, by the software-defined network controller, a virtual local area network (VLAN) identifier to the traffic flow; configuring the edge device to add the assigned VLAN identifier to outgoing frames associated with the traffic flow, wherein the outgoing frames are frames that will be transmitted to a core network.

Various embodiments additionally include instructions for configuring, in response to assigning the VLAN identifier, at least one additional edge device to remove the VLAN identifier from incoming frames associated with the traffic flow, wherein the incoming frames are frames that have traversed at least one core node of the core network.

Various embodiments are described wherein the edge device is a hypervisor edge switch running on a server and a first end device of the at least two end devices is a virtual machine running on the server.

Various embodiments are described wherein the instructions for assigning a virtual local area network (VLAN) identifier to the traffic flow include: instructions for analyzing load placed on the core network by a plurality of assigned VLANs; and instructions for selecting an unassigned VLAN based on the analyzed load on the core network.

Various embodiments are described wherein the instructions for selecting an unassigned VLAN based on the analyzed load on the core network include instructions for selecting a VLAN for which the traffic flow will utilize links in the core network that currently have lower utilization than other links in the core network.

Various embodiments additionally include instructions for determining whether the at least two end devices belong to the same tenant; and instructions for configuring the edge device to drop the traffic flow when the at least two end devices do not belong to the same tenant, wherein the instructions for assigning a virtual local area network (VLAN) identifier to the traffic flow are configured for execution based on the at least two end devices belonging to the same tenant.

Various embodiments additionally include instructions for determining, based on an amount of endpoint state information stored in at least one core device of the core network, that the software-defined network will enter an encapsulation mode; and instructions for configuring the edge device to encapsulate outgoing frames associated with the traffic flow to produce encapsulated outgoing frames that are destined for at least additional edge device and are tagged with the VLAN identifier.

Various embodiments described herein relate to a machine-readable storage medium encoded with instructions for execution by a software-defined network (SDN) controller, the medium including: instructions for receiving a first configuration request from an edge device, wherein the configuration request identifies a first traffic flow between at least two end devices other than the edge device and includes an address; instructions for identifying an address conflict including: instructions for identifying a previously-configured second traffic flow also utilized the address, and instructions for determining that the first traffic flow and the second traffic flow belong to different cloud tenants; and instructions for configuring the edge device to perform address translation on outgoing frames to replace the address with an alternative address, wherein the outgoing frames are frames that will be transmitted by the edge device to a core network.

Various embodiments described herein relate to a software-defined network controller including: a network interface; a memory; and a processor in communication with the network interface and the memory, the processor being configured to: receive a first configuration request from an edge device, wherein the configuration request identifies a first traffic flow between at least two end devices other than the edge device and includes an address; identify an address conflict including: identifying a previously-configured second traffic flow also utilized the address, and determining that the first traffic flow and the second traffic flow belong to different cloud tenants; and instructions for configuring the edge device to perform address translation on outgoing frames to replace the address with an alternative address, wherein the outgoing frames are frames that will be transmitted by the edge device to a core network.

Various embodiments described herein relate to a method performed by a software-defined network controller, the method including: receiving a first configuration request from an edge device, wherein the configuration request identifies a first traffic flow between at least two end devices other than the edge device and includes an address; identifying an address conflict including: indentifying a previously-configured second traffic flow also utilized the address, and instructions for determining that the first traffic flow and the second traffic flow belong to different cloud tenants; and configuring the edge device to perform address translation on outgoing frames to replace the address with an alternative address, wherein the outgoing frames are frames that will be transmitted by the edge device to a core network.

Various embodiments additionally include instructions for receiving a first configuration request from an edge device, wherein the configuration request identifies a first traffic flow between at least two end devices other than the edge device and includes an address; instructions for identifying an address conflict including: instructions for a previously-configured second traffic flow also utilized the address, and instructions for determining that the first traffic flow and the second traffic flow belong to different cloud tenants; and instructions for configuring the edge device to perform address translation on outgoing frames to replace the address with an alternative address, wherein the outgoing frames are frames that will be transmitted by the edge device to a core network.

Various embodiments additionally include instructions for configuring, in response to identifying an address conflict, at least one additional edge device to perform address translation on incoming frames to replace the alternative address with the address that was previously removed, wherein the incoming frames are frames that have traversed at least one core node of the core network.

Various embodiments are described wherein the address and the alternative address are media access control (MAC) addresses.

Various embodiments are described wherein the address and the alternative address are IP addresses associated with multicast traffic.

Various embodiments are described wherein the edge device is a hypervisor edge switch and at least one of the edge devices is a virtual machine executing on the same hardware as the hypervisor edge switch.

Various embodiments additionally include instructions for configuring the edge device to perform Internet group management protocol (IGMP) snooping and to forward an IGMP multicast address to the SDN controller ad part of the first flow identification.

Various embodiments additionally include instructions for assigning a first VLAN identifier to the first flow; and instructions for configuring the edge device to add the VLAN identifier to the outgoing frames.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

While various techniques such as tunneling can be used to bypass the native VLAN limitations, these solutions typically add an undesirable amount of overhead to the solution by, for example, using additional bits to define an encapsulation header, leaving fewer bits within the maximum transmission unit (MTU) available to convey the data payload. Additional drawbacks will be apparent. Accordingly, it would be desirable to provide methods and systems for utilizing native VLANs within cloud networks and other high-scalability networks. Accordingly, various embodiments described herein use software defined networking (SDN) to dynamically assign established VLANs within the core network to traffic flows as they are established.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., or), unless otherwise indicated (e.g., "or else" or "or in the alternative"). Additionally, the various embodiments described herein are not necessarily mutually exclusive and may be combined to produce additional embodiments that incorporate the principles described herein.

Figure 1:
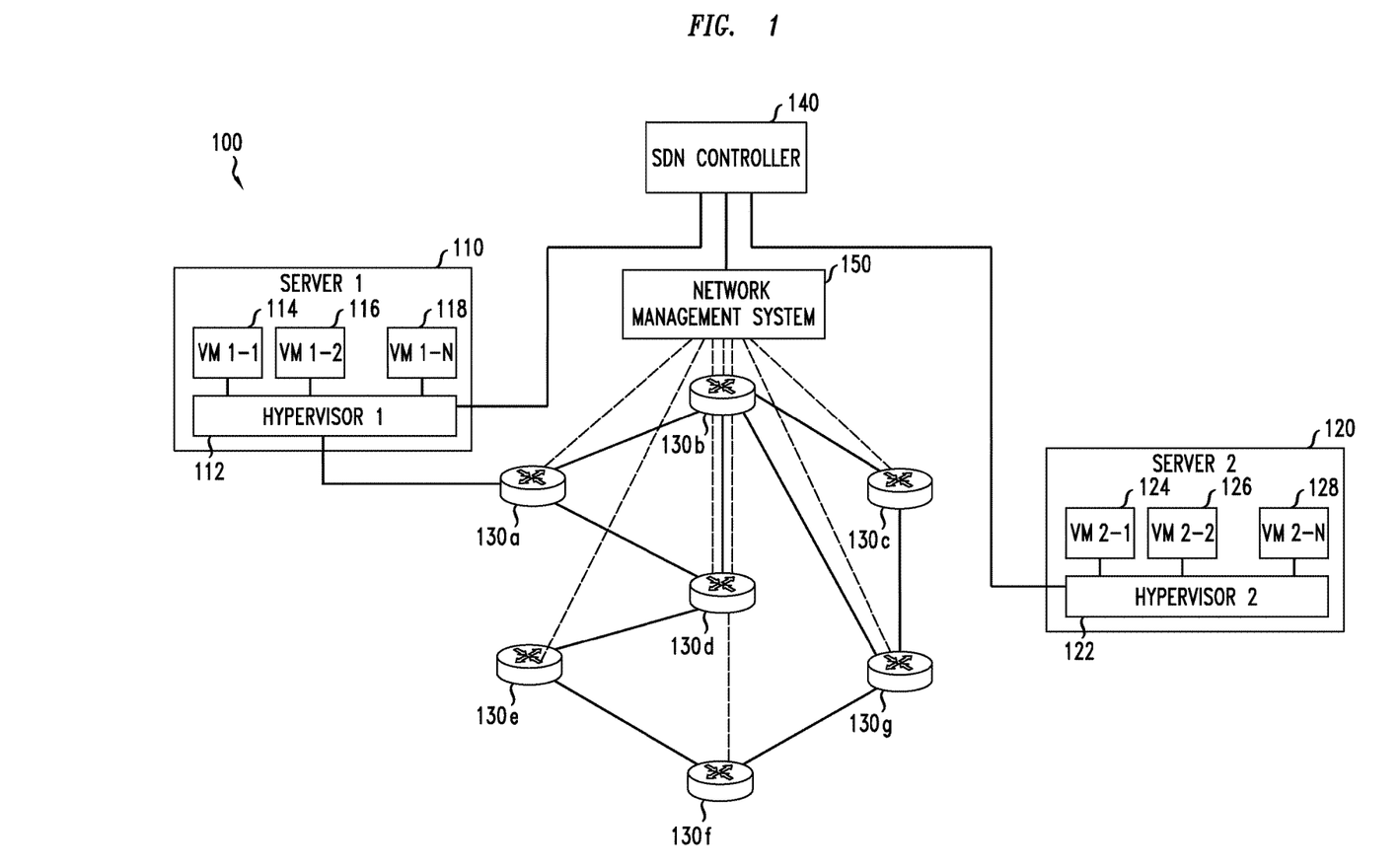
FIG. 1 illustrates an exemplary environment for providing scalable virtual networks.

FIG. 1 illustrates an exemplary environment 100 for providing scalable virtual networks. The network 100 may be a cloud computing network or a portion thereof. It will be apparent that various alternative arrangements may be used such as, for example, alternative networks including additional servers or additional routers.

As shown, the network includes two servers 110, 120 interconnected by a core network of routers 130. In various embodiments, the core nodes 130 are conventional switches configured to facilitate communication between multiple servers within a data center or between multiple data centers. Various alternatives for the core nodes 130 will be apparent such as, for example, conventional routers or SDN switches/ routers. Accordingly, in various embodiments, the core nodes 130 may span a large network such as the Internet. The servers 110, 120 may be located in the same data center as each other or may be geographically separated. The servers 110, 120 both support a multiple virtual machines (VMs) 114-118, 124-128 along with respective hypervisors 112, 122. The VMs 114-118, 124-128 may belong to various cloud tenants and, as such, may implement various applications as designed by the respective cloud tenants. For example, a first tenant may wish to deploy a web service and may configure VM 1-1 114 and VM 2-2 126 as web servers and VM 1-2 116 as a backend database for use by the web servers. Various additional applications and virtual machine types will be apparent. In various configurations, the VMs 114-118, 124-128 may initiate and receive communications between each other and other network devices. As such, the VMs 114-118, 124-128 may be considered "endpoints." As will be understood, an endpoint may be any entity which sends and receives Ethernet frames or other datagrams. Endpoints can either be VMs or physical machines. Each endpoint may belong to a tenant and multiple tenants may share the same network infrastructure.

The hypervisors 112, 122 may be processes running on the respective servers that perform various management functions with respect to the virtual machines 114-118, 124-128. For example, the hypervisor may create, schedule, and direct execution of respective VMs. Additionally, the hypervisor may act as an intermediate network device situated in the data path between the virtual machines 114-118, 124-128 and the core network 130. As such, the hypervisors 112, 122 may include hypervisor edge switches within the network. In other words, when VM 2-2 126 wishes to transmit a frame of data to VM 1-2 116, VM 2-2 126 first transmits this frame to hypervisor edge switch 2 122, which forwards the frame over the core network 130 to hypervisor edge switch 1 112, which then forwards the frame to the appropriate VM 1-2 116. As will be understood an edge switch or other edge device may be any Ethernet or other protocol switch to which endpoints connect. For example, if the endpoint is a VM, then the edge switch may be a hypervisor based software switch. If the endpoints are physical, then the edge switch may be a physical edge switch. Various switches within the systems described herein include edge switches that, whether virtual or physical, are SDN enabled and controlled by a logical SDN controller.

In various embodiments, the hypervisor edge switches are implemented as, or otherwise provided with, software-defined network (SDN) switches. In other words, an SDN controller 140 may transmit configuration information to the hypervisor edge switches 112, 122 to instruct the hypervisor edge switches 112, 122 as to how different traffic should be handled. For example, the SDN controller 140 may configure hypervisor edge switch 2 to drop any frames sent by VM 2-2 124 to VM 2-1 124 or VM 1-N 118 if these VMs are associated with different cloud tenants to provide cross-tenant traffic isolation.

The SDN controller 140 may be virtually any device capable of configuring the hypervisor edge switches 112, 122 according to various SDN conventions. In some embodiments, the SDN controller 140 may be one of the virtual machines 114-118, 124-128 or another standalone device in communication with the core network 130. In various embodiments the SDN controller is a logically centralized entity capable of programming edge switches to perform various functions such as network address translation (NAT), tunneling (e.g., adding encapsulation headers) network messages on a per flow basis, or adding and removing VLAN tags from such messages. The SDN controller 140 may also be aware of the topology of the entire network, including core switches and may interface with a Network Management System (NMS) 150 which may inform the SDN controller 140 of the state of overload of each core switch.

Figure 2:
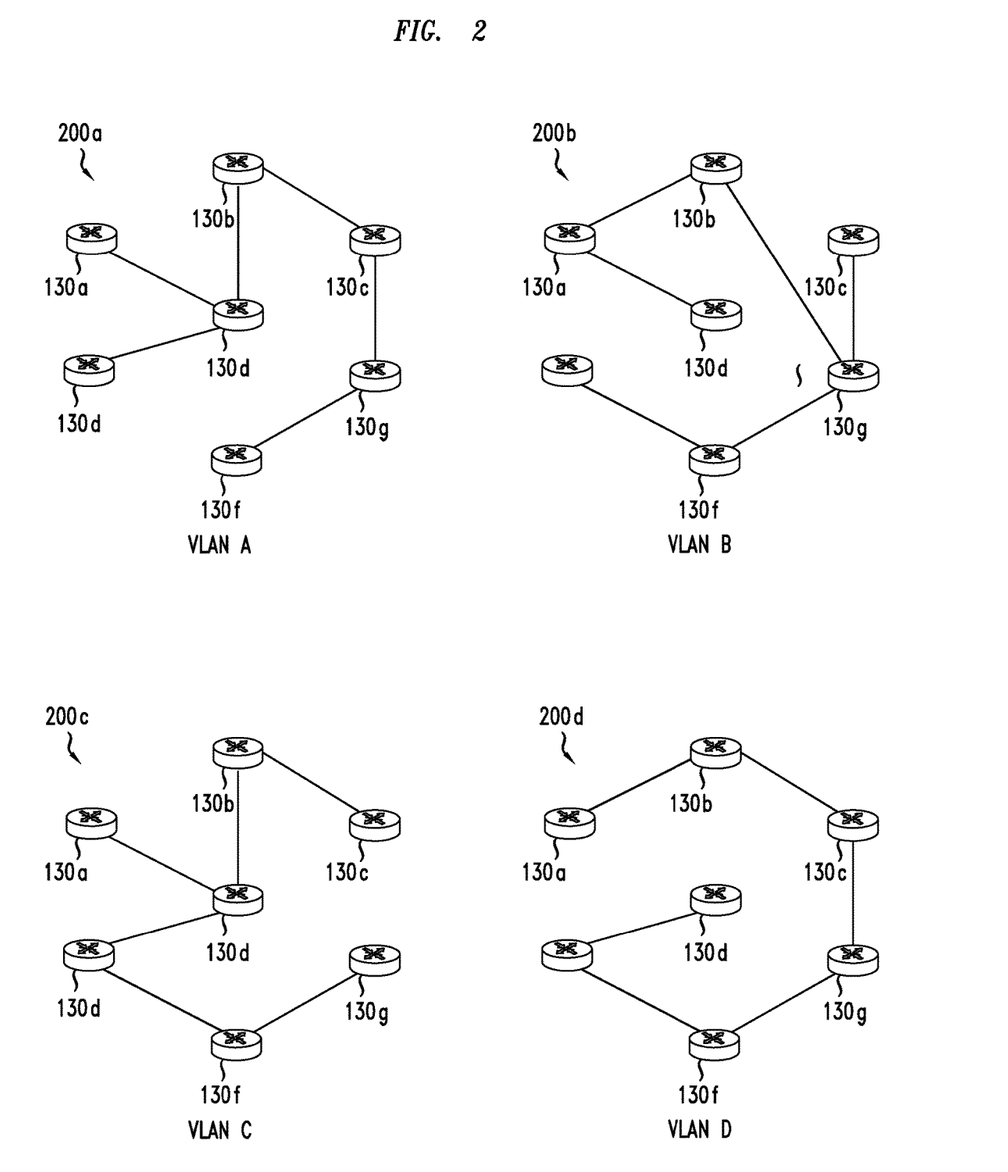
FIG. 2 illustrates a plurality of exemplary virtual local area networks (VLANs)

In various embodiments, the core network 130 implements multiple VLANs for use in transporting VM flows. FIG. 2 illustrates a plurality of exemplary virtual local area networks (VLANs) 200. As shown, given the connections between the core nodes illustrated in FIG. 1, many VLANs are possible. According to such different VLANs, traffic between the two servers 110, 120 may traverse different routers 130. For example, if traffic between the servers 110, 120 were routed over VLAN A 200a, the traffic would traverse routers 130a, 130d, 130b, 130c, 130g. The same traffic over VLAN B 200b, however, would only traverse routers 130a, 130b, 130g. On VLANs C 200c and D 200d, the traffic would similarly traverse different sets of routers. As will be understood, VLANs may thus be used to help optimize the bisectional bandwidth and other efficiencies used in the core network 130. For example, for two different flows between the two servers 110, 120, a first flow may be forwarded over VLAN C 200c and a second flow may be forwarded over VLAN D 200d. As such, other than the routers 130a, 130g directly attached to the servers 110, 120, the traffic will traverse entirely different routers, thus reducing the load placed on any one router compared to the case of forwarding both flows over the same set of routers. Various modifications will be apparent. For example, in some embodiments, the core network 130 may be configured with VLANs that do not include every router 130.

Figure 3:
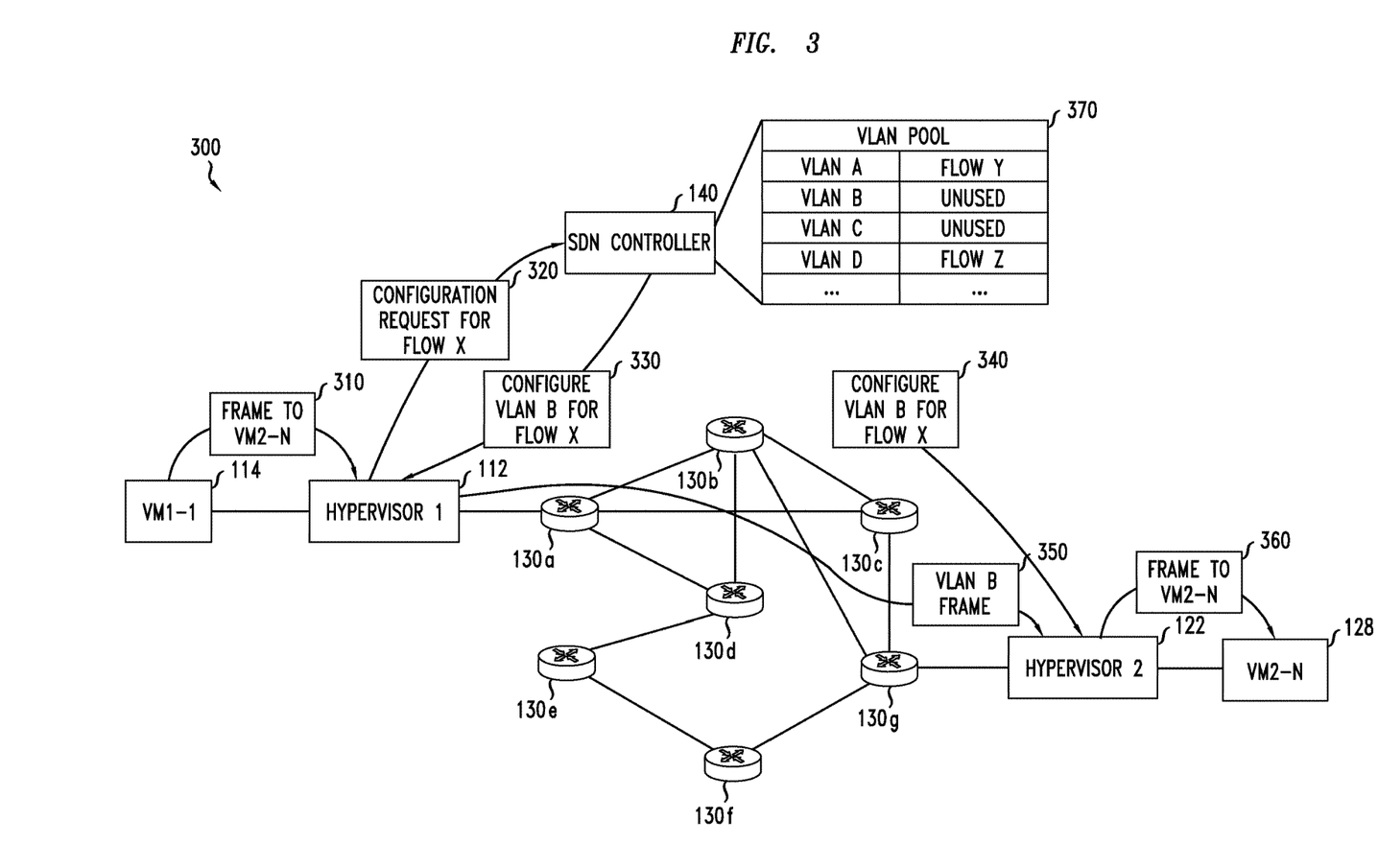
FIG. 3 illustrates an exemplary message exchange through the exemplary environment of FIG. 1.

According to various embodiments, the SDN controller 140 may dynamically assign existing VLANs within the core network to new flows and configure the relevant hypervisor edge switches 114, 122 to implement VLAN functionality in a manner is invisible to the virtual machines 114-118, 124-128 and the cloud tenants. FIG. 3 illustrates an exemplary message exchange 300 through the exemplary environment of FIG. 1.

As shown, the message exchange 300 begins when VM1-1 114 constructs an Ethernet frame 310 destined for VM 2-N 128 and transmits that frame 310 to hypervisor edge switch 1 112. Hypervisor edge switch 1 112 determines that frame 310 belongs to a new flow and that, as such, the hypervisor edge switch 1 112 is not yet configured to process that flow. Hypervisor edge switch 112 constructs a configuration request including an identification of the flow ("Flow X") and transmits the request to the SDN controller 140. The SDN controller 140 verifies that the two VMs 114, 128 are permitted to communicate (e.g. that they are associated with the same cloud tenant) and then selects a VLAN from the available VLAN pool 370. As shown, the VLAN pool 370 includes at least four existing VLANs within the core network, VLANs A-D, which may correspond to the VLANs described with respect to FIG. 2. In the example shown, two of these VLANs are already assigned to existing flows. The SDN controller 140 selects unused VLAN B for assignment to the new flow and subsequently configures the two hypervisor edge switches 112, 122 to transparently utilize VLAN B for this new flow. For example, the SDN controller may configure 330, 340 both hypervisor edge switches 112, 122 to add the VLAN B tag to outgoing frames (i.e., frames that are being forwarded from the respective VM 112, 128 toward the core network 130) belonging to the flow and to remove the VLAN B tag from incoming frames (i.e. frames that have already traversed the core 130) associated with the flow.

After receiving the configuration 330, the hypervisor edge switch 112 tags the frame 310 with the VLAN B tag and forwards it to the attached core node 130a. Then, based on the VLAN B tag, the frame 350 is forwarded through routers 130b, 130g and to hypervisor edge switch 2 122. Hypervisor edge switch 2 122, based on the configuration 340, untags the received frame and passes it 360 to VM 2-N 128 based on the destination address of the frame.

Various modifications to the above-described system will be apparent. For example, in various embodiments, multiple flows may be assigned to the same VLAN. This is possible in embodiments wherein SDN is used to provide cross-tenant isolation instead of the VLANs themselves. The SDN may then be free to use the available VLANs to provide better bisectional bandwidth. For example, when selecting a VLAN for a new flow, the SDN may choose an existing VLAN having the least number of flows already assigned to it or may rely on performance data received from the routers in the core 130 to select a VLAN that is experiencing relatively low traffic or resource usage. As another example and as will be described in greater detail below, the SDN controller may also be configured to select VLANs for use in transporting multicast traffic across the core 130, to configure hypervisor edge switches to perform MAC or IP address translation, and to configure hypervisor edge switches to encapsulate traffic at desirable times.

It will be apparent that, while various exemplary embodiments described herein are directed to SDN-programmable hypervisor edge switches, various alternative edge switches may be used. For example, hardware-based edge switches or other software edge switches may be provided within the network and configured by the SDN controller to implement various functionalities described herein.

Figure 4:
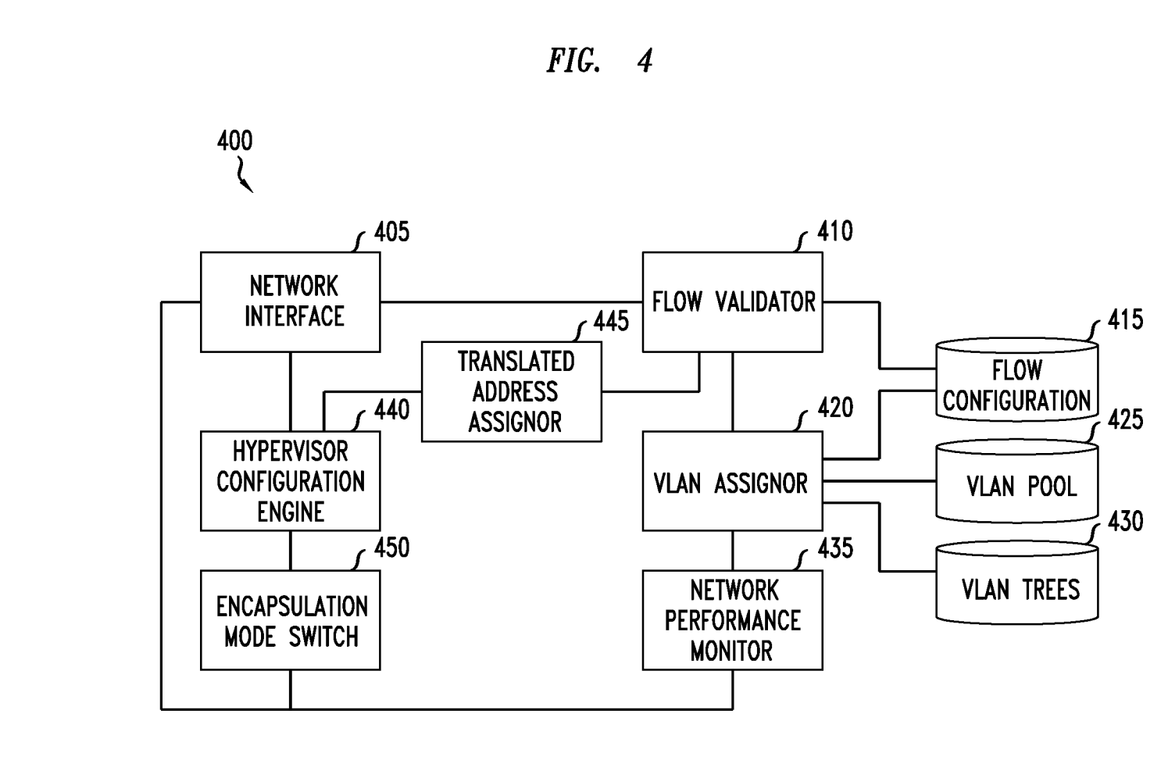
FIG. 4 illustrates an exemplary software-defined network (SDN) controller.

FIG. 4 illustrates an exemplary software-defined network (SDN) controller 400. It will be appreciated that various alternative implementations may be used to achieve the various methods and systems described herein. It will further be apparent that the components of the SDN controller 400 are implemented by hardware, such as the exemplary hardware that will be described in greater detail below with respect to FIG. 5.

The SDN controller 400 includes a network interface configured to enable communication with other devices, such as core nodes and hypervisor edge switches. A flow validator 410 receives configuration requests from edge devices such as hypervisor edge switches via the network interface 405. The flow validator 410 extracts a flow identifier such as an identification of the source and destination MAC addresses along with an identification of the associated client, the VMs, or the hypervisor edge switch. Then, using the information stored in the flow configurations storage 415, the flow validator 410 determines whether the flow should be allowed. For example, the flow validator 410 may determine whether the endpoints belong to the same tenant. If the flow should not be allowed, the flow validator 410 simply sends a denial instruction back to the requestor, indicating the frames from the requested flow should be dropped.

Otherwise, if the flow is to be configured, the flow validator 410 passes the request to a VLAN assignor 420 which assigns a VLAN from the VLAN pool 425 to the new flow. For example, the VLAN assignor 420 may select an unused VLAN if available or may select a VLAN that has relatively low utilization. In some embodiments, the VLAN assignor 420 may additionally take into account the network topology, existing flow assignments, or network performance when selecting a VLAN for a new flow. For example, the VLAN assignor 420 may review the network trees 440 associated with the various assigned VLANs to locate a VLAN for the new flow that utilizes links that are experiencing relatively low use according to the existing VLAN assignments. For example, returning to FIG. 2, if the VLAN assignor 420 notes that VLAN A and VLAN B are being used for two different flows currently and is selecting between VLAN C and VLAN D, the VLAN assignor 420 may select VLAN C because its tree shares fewer links in common with VLANS A and B than VLAN D on the relevant path. Various alternative methods for selecting a VLAN assignment will be apparent.

In some embodiments, a network performance monitor 435 may track the performance or other characteristics of the core network. For example, the network performance monitor 435 may poll various core nodes via the network interface to gather performance data. Additionally or alternatively, the network performance monitor 435 may periodically receive event reports from the core nodes via the network interface 405. In various embodiments, the VLAN assignor 420 uses this information to select a VLAN for assignment to a new flow. For example, the VLAN assignor 420 may favor routes that are experiencing relatively low load when selecting a VLAN. Various additional methods for utilizing network performance or state data to select a VLAN for a new flow will be apparent.

After the VLAN assignor 420 has assigned a VLAN to the new flow, the hypervisor edge switch configuration engine 440 transmits configurations via the network interface 405 to the relevant hypervisor edge switches for the flow. For example, hypervisor edge switch configuration engine 440 may utilize SDN protocols to configure the hypervisor edge switches to tag outgoing frames with the assigned VLAN and to receive incoming frames according to the VLAN and to subsequently strip the VLAN tag from such incoming frames. Various methods for effecting such configuration will be apparent.

In various embodiments, the flow validator 410 may also utilize existing flow configurations to determine whether a new flow reveals an address conflict. For example, because virtual machines are not generally each provided with a unique network interface card, each virtual machine will usually generate its own MAC address to uniquely identify it among the other VMs executing on the same server. This, however, increases the chances that two machines within the same cloud network may assume the same MAC address. Thus, in some embodiments, the flow validator 410 determines whether a source or destination MAC address reported in the configuration request is already known to be used by another virtual machine associated with a different flow. If so, in addition to passing the request to the VLAN assignor 420, the flow validator 410 instructs the translated address assignor 445 to assign a new address to the source or destination of the flow (or both). The translated address assignor 445 then selects a new MAC address that is not known to be used by another virtual machine in the network and instructs the hypervisor edge switch configuration engine 440 to configure the relevant hypervisor edge switches for the flow to perform address translation on incoming and outgoing frames. Thus, the conflicted address will still be used between the VMs and hypervisor edge switches at both ends, but while the frame is traversing the core it will include an alternative MAC address that does not conflict with any other devices.

In various embodiments, the flow validator 410 may alternatively or additionally ensure that there is not an IP address conflict between flows. For example, in embodiments using IP multicast, multiple tenants may select the same multicast address for their applications. In some such embodiments, the hypervisor edge switches may be configured to perform Internet group management protocol (IGMP) snooping to identify outgoing IGMP packets and their associated multicast addresses and to report this information with the flow configuration request. If the flow validator 410 identifies such a conflict, the configuration and translation is performed in a manner similar to that described above with respect to MAC address conflicts. Specifically, the translated address assignor 445 may select an unused multicast address and the hypervisor edge switch configuration engine 440 may configure the relevant hypervisor edge switches to perform IP address translation (e.g., network address translation/NAT) for packets belonging to the flow such that the alternative multicast IP address is used within the core.

In various networks, as the number of endpoints (e.g. VMs) rises, the amount of per-endpoint state information maintained by the core nodes may become exceedingly large. This may have an adverse impact on network performance. Accordingly, in some embodiments, the SDN controller 400 may be configured to respond to such situations. For example, the core nodes may be configured to provide alerts to the network performance monitor 435 when the state information exceeds a threshold. In response, the network performance monitor 435 informs the encapsulation mode switch 450 which, in turn, invoke encapsulation mode by instructing the hypervisor edge switch configuration engine to configure the hypervisor edge switches for each existing or each new flow to perform encapsulation of outgoing frames. This encapsulation, along with an implementation where VMs outnumber hypervisor edge switches, enables tunneling between the edge devices such that the core nodes may maintain state information for fewer or no virtual machines, thereby reducing the number of endpoints that each core node must track. Upon receiving an indication that the state information stored at the core nodes has fallen sufficiently, the encapsulation mode switch 450 may then initiate a switch back to non-encapsulation mode and operation as previously described.

For example, returning to FIG. 3, if the SDN controller 140 determines that the flow X or the network 100 as a whole should enter encapsulation mode, the SDN controller 140 will configure hypervisor edge switch 1 112 to encapsulate the outgoing frame 310 (e.g., using a MAC-in-MAC tunnel) and provide an encapsulated frame tagged with VLAN B and destined for hypervisor edge switch 2 122 instead of VM 2-N 128. The SDN controller 140 would also configure hypervisor edge switch 2 122 to decapsulate such incoming frames prior to passing them to the VM 2-N such that the encapsulation is transparent to the supported application.

Figure 5:
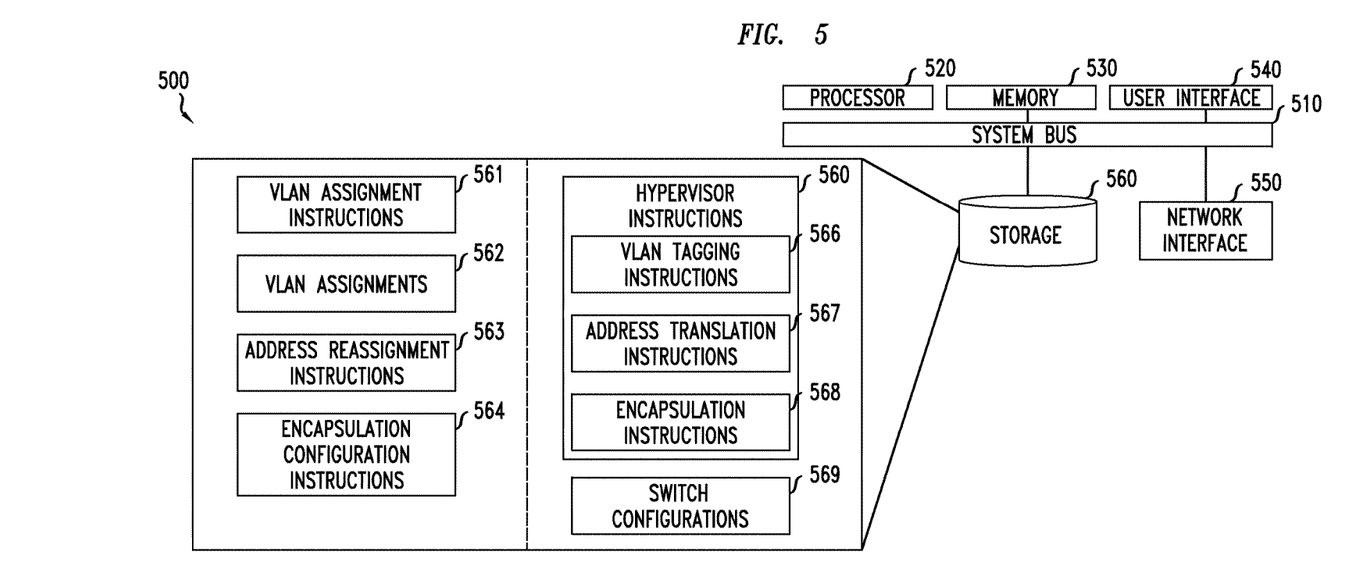
FIG. 5 illustrates an exemplary hardware diagram for implementing an edge device or SDN controller.

FIG. 5 illustrates an exemplary hardware diagram 500 for implementing an edge device or SDN controller. The exemplary hardware 500 may correspond to the SDN controller 140 or one or more of the servers 110,120 of FIG. 1. As shown, the device 500 includes a processor 520, memory 530, user interface 540, network interface 550, and storage 560 interconnected via one or more system buses 510. It will be understood that FIG. 5 constitutes, in some respects, an abstraction and that the actual organization of the components of the device 500 may be more complex than illustrated.

The processor 520 may be any hardware device capable of executing instructions stored in memory 530 or storage 560 or otherwise processing data. As such, the processor may include a microprocessor, field programmable gate array (FPGA), application-specific integrated circuit (ASIC), or other similar devices.

The memory 530 may include various memories such as, for example L1, L2, or L3 cache or system memory. As such, the memory 5.0 may include static random access memory (SRAM), dynamic RAM (DRAM), flash memory, read only memory (ROM), or other similar memory devices.

The user interface 540 may include one or more devices for enabling communication with a user such as an administrator. For example, the user interface 540 may include a display, a mouse, and a keyboard for receiving user commands. In some embodiments, the user interface 540 may include a command line interface or graphical user interface that may be presented to a remote terminal via the network interface 550.

The network interface 550 may include one or more devices for enabling communication with other hardware devices. For example, the network interface 550 may include a network interface card (NIC) configured to communicate according to the Ethernet protocol. Additionally, the network interface 550 may implement a TCP/IP stack for communication according to the TCP/IP protocols. Various alternative or additional hardware or configurations for the network interface 550 will be apparent.

The storage 560 may include one or more machine-readable storage media such as read-only memory (ROM), random-access memory (RAM), magnetic disk storage media, optical storage media, flash-memory devices, or similar storage media. In various embodiments, the storage 560 may store instructions for execution by the processor 520 or data upon with the processor 520 may operate.

For example, where the hardware 500 implements an SDN controller, the storage 560 stores VLAN assignment instructions 561 for assigning VLANs to new flows and configuring the relevant hypervisor edge switches to tag and untag traffic associated with such new flows. The storage 560 may also store records of previous VLAN flow assignments 562 to support the VLAN assignment instructions. Further, in some embodiments, the storage additionally stores address reassignment instructions 563 and encapsulation configuration instructions 564 for configuring hypervisor edge switches to perform address translation and encapsulation when appropriate, as described above.

As another example, when the hardware implements a server, the storage may store hypervisor edge switch instructions 565 for managing various virtual machines that may be instantiated in, for example, memory 530. The hypervisor edge switch instructions 565 may also store VLAN tagging instructions 566 for tagging and untagging frames, address translation instructions 567 for performing MAC, IP, or other address translations, and encapsulation instructions 568 for encapsulating and decapsulating frames when encapsulation mode is on for a flow or the entire network. The storage 560 also includes SDN switch configurations 569 for driving or otherwise informing the execution of the various instructions 566, 567, 568. For example, the switch configurations may indicate which VLAN tags should be added to outgoing traffic, which incoming VLAN traffic should be recognized, which addresses to translate, and when encapsulation is enabled. Exemplary switch configurations will be described in greater detail below with respect to FIG. 7.

It will be apparent that various information described as stored in the storage 560 may be additionally or alternatively stored in the memory 530. In this respect, the memory 530 may also be considered to constitute a "storage device" and the storage 560 may be considered a "memory." Various other arrangements will be apparent. Further, the memory 530 and storage 560 may both be considered to be "non-transitory machine-readable media." As used herein, the term "non-transitory" will be understood to exclude transitory signals but to include all forms of storage, including both volatile and non-volatile memories.

While the hardware device 500 is shown as including one of each described component, the various components may be duplicated in various embodiments. For example, the processor 520 may include multiple microprocessors that are configured to independently execute the methods described herein or are configured to perform steps or subroutines of the methods described herein such that the multiple processors cooperate to achieve the functionality described herein. Further, where the device 500 is implemented in a cloud computing system, the various hardware components may belong to separate physical systems. For example, the processor 520 may include a first processor in a first server and a second processor in a second server.

Figure 6:
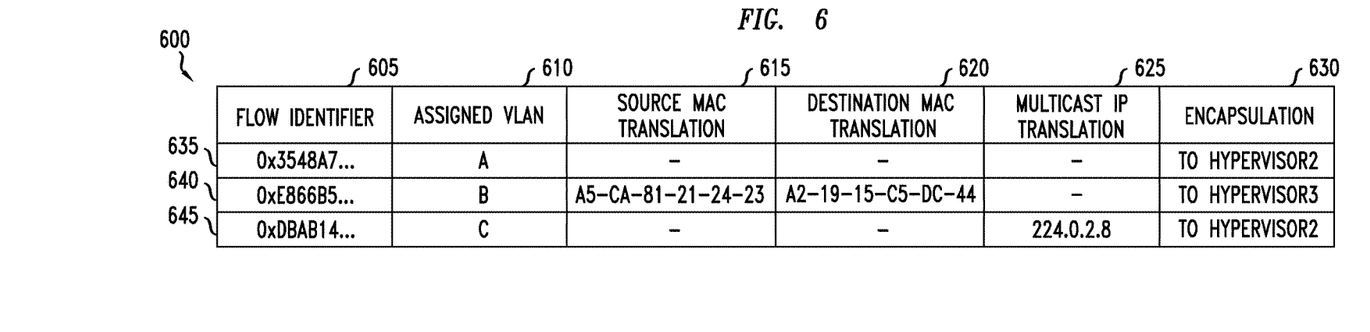
FIG. 6 illustrates an exemplary data arrangement for storing router configuration information.

FIG. 6 illustrates an exemplary data arrangement 600 for storing router configuration information. The data arrangement may describe the contents of the switch configurations 569 in FIG. 5. It will be apparent that the data arrangement 600 may be a simplification and alternative methods of storing configuration may be used. For example, the VLAN and encapsulation configurations may be stored separately from the address translation configurations.

As shown, the data arrangement 600 includes a flow identifier field for storing an indication of the flow to which each record corresponds. Virtually any value for identifying a flow through a hypervisor edge switch may be used. For example, the source and destination MAC addresses or VM identifiers may be used. An assigned VLAN field 610 indicates the VLAN to which the flow is assigned. The data arrangement 600 also includes a source MAC translation field 615, a destination MAC translation field 620, and a multicast IP translation field 625 for storing alternative source MAC, destination MAC, and multicast IP addresses, respectively, for use as the flow traverses the core network. An encapsulation field 630 indicates whether and to which edge routers encapsulation should be used for the flow.

As an example, a first configuration record 635 indicates that the flow identified by the identifier "0x3548A7 . . . " frames should carry the VLAN tag "A" while traversing the core. Further, the frames should be encapsulated in a frame that is addressed to Hypervisor edge switch 2. As another example, a second configuration record 640 indicates that the flow identified by the identifier "0xE866B5 . . . " frames should carry the VLAN tag "B" while traversing the core, and that both the source and destination MAC addresses should be translated. Further, the frames should be encapsulated in a frame that is addressed to Hypervisor edge switch 3.

As a final example, a third configuration record 645 indicates that the flow identified by the identifier "0xDBAB14 . . . " frames should carry the VLAN tag "C" while traversing the core and that the packet within the frame should be subjected to multicast IP address translation. Further, the frames should be encapsulated in a frame that is addressed to Hypervisor edge switch 2.

Figure 7:
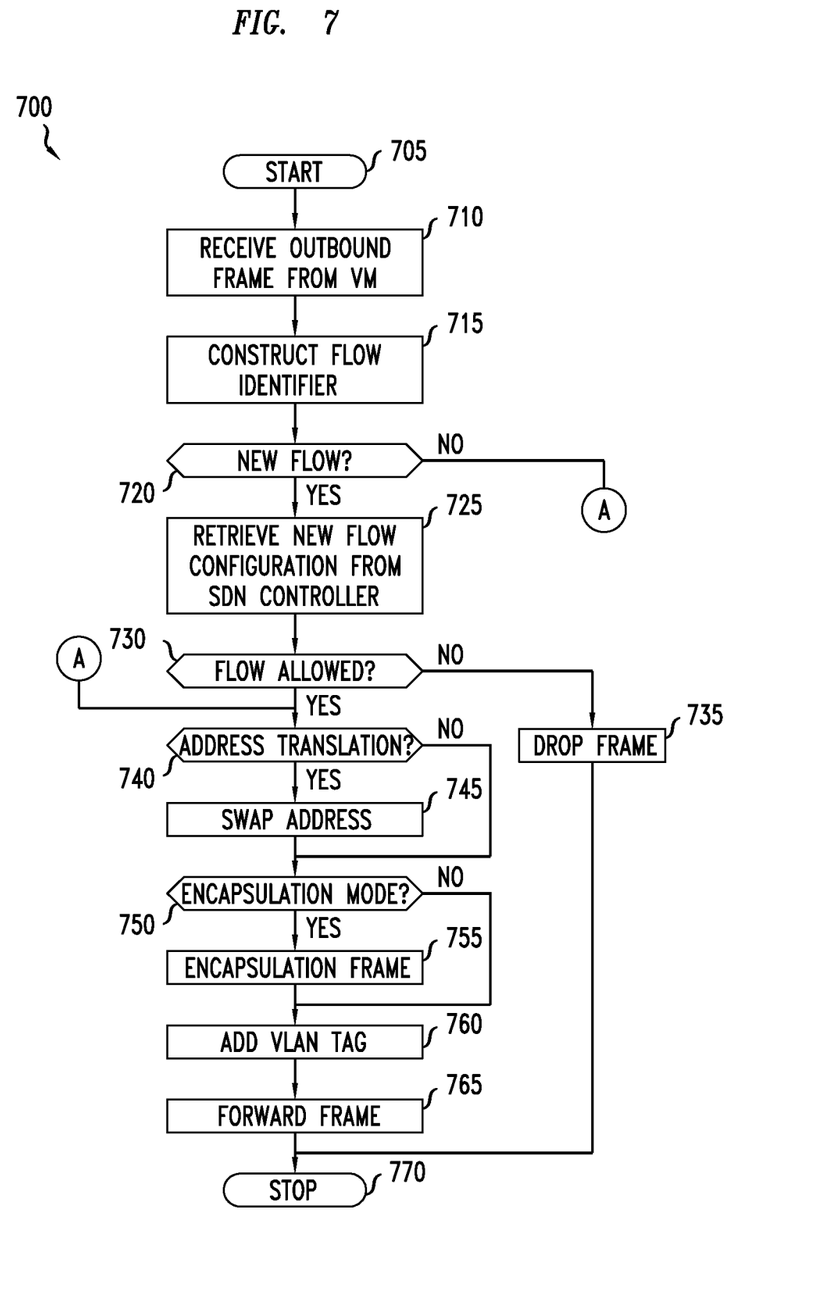
FIG. 7 illustrates an exemplary method for processing outgoing frames at an edge device.

FIG. 7 illustrates an exemplary method 700 for processing outgoing frames at an edge device. The method 700 may be performed by a hypervisor edge switch such as one of the hypervisor edge switches 112, 122 of FIG. 1 upon receiving an outgoing frame.

The method begins in step 705 and proceeds to step 710 where the hypervisor edge switch receives an outbound frame from a VM. Next, in step 715, the hypervisor edge switch constructs a flow identifier, such as a grouping of the source and destination addresses or source and destination VM identifiers. In step 720, the hypervisor edge switch determines whether the flow is a new flow by, for example, determining whether the hypervisor edge switch has access to configuration information associated with the flow identifier. If so, the method skips to step 740. Otherwise, the hypervisor edge switch retrieved new flow configuration information from the SDN controller in step 725. For example, the hypervisor edge switch may construct a configuration request including the flow identifier, transmit it to the SDN controller, and await a response. In step 730, the hypervisor edge switch determines whether the response indicates that the flow will be allowed. If not, the hypervisor edge switch drops the frame in step 735 and the method proceeds to end in step 770.

In step 740, the hypervisor edge switch determines whether, based on the configuration information available for the flow, any address translation should be performed. If so, the hypervisor edge switch swaps any addresses for the configured alternate addresses in step 745. In step 750, the hypervisor edge switch determines whether, based on the configuration information available for the flow, the frame should be encapsulated. If so, the hypervisor edge switch encapsulates the frame within, for example, another Ethernet frame and addresses the encapsulated frame to the configured destination hypervisor edge switch in step 755. In step 760, the hypervisor edge switch adds the VLAN tag configured for the outgoing frame and then, in step 765, forwards the frame to the core network for routing. The method 700 then proceeds to end in step 770.

The steps performed when receiving an incoming frame will be apparent. For example, the hypervisor edge switch, may perform the inverse operations of steps 760, 755, and 745 in reverse order as appropriate to retrieve the frame in the same form as initially sent by the origin VM and then forward the frame to the destination VM.

Figure 8:
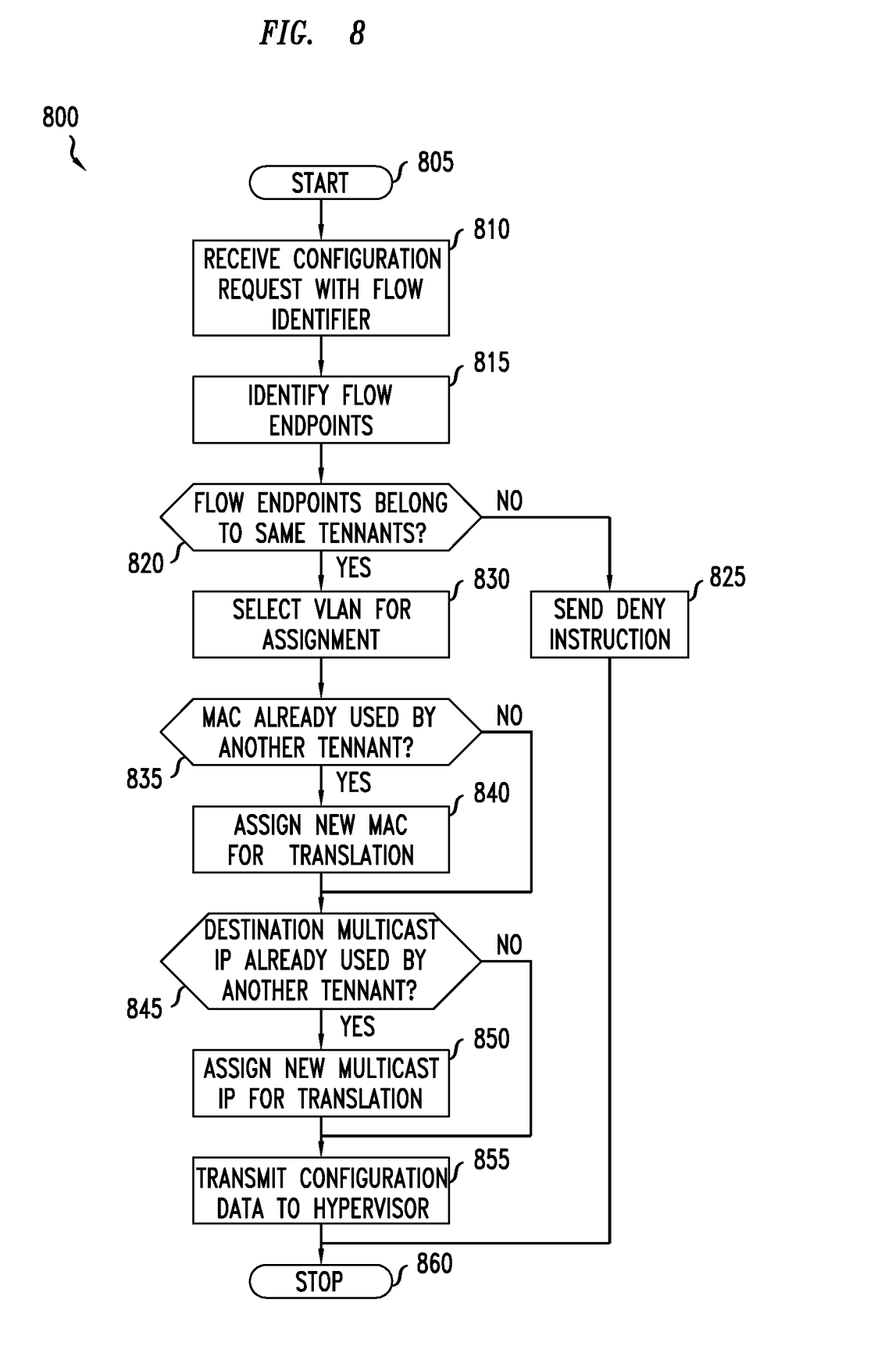
FIG. 8 illustrates an exemplary method for processing a configuration request by an SDN controller.

FIG. 8 illustrates an exemplary method 800 for processing a configuration request by an SDN controller such as, for example, the SDN controller 140 of FIG. 1. The method 800 begins in step 805 and proceeds to step 810 where the SDN controller receives a configuration request from a hypervisor edge switch including a flow identifier. Next, in step 815 where the SDN controller determines the endpoint VMs for the flow from, for example, the flow identifier. The SDN controller enforces tenant isolation in step 820 by determining whether the endpoints belong to the same tenant. If not, the SDN controller sends an instruction to the requesting hypervisor edge switch to deny the flow in step 825 and the method 800 proceeds to end in step 860.

If, on the other hand, the flow is to be allowed and configured, the method proceeds to step 830 where the SDN controller selects a VLAN for assignment to the new flow. This selection may be made in virtually any manner such as, for example, randomly, based on the number of flows assigned to each available VLAN, based on the least utilized VLAN, or based on the current network performance.

In step 835, the SDN controller determines whether either the destination of source MAC address is already being used by another tenant by, for example, referring to the currently configured flows. If there is an identified MAC conflict in step 835, the SDN controller assigns one or more new MAC addresses that are not known to be utilized within the core network. Similarly, in step 845, the SDN controller determines whether there is a multicast IP conflict if the flow relates to IP multicast traffic. If so, the SDN controller assigns a new multicast IP that is not known to be used within the core network. The SDN controller then transmits configuration data to the requesting hypervisor edge switch in step 855 to configure the requesting hypervisor edge switch or hypervisor edge switch(es) at the destination(s) to perform the VLAN tagging along with any address translation if any alternative addresses were assigned in steps 840 or 850 for outgoing frames. Step 855 may also include the SDN controller configuring the other hypervisor edge switches or the requesting hypervisor edge switch to perform the reverse operations for incoming frames including untagging the frames and reverting the translated addresses back to their original form. The method then proceeds to end in step 860.

Figure 9:
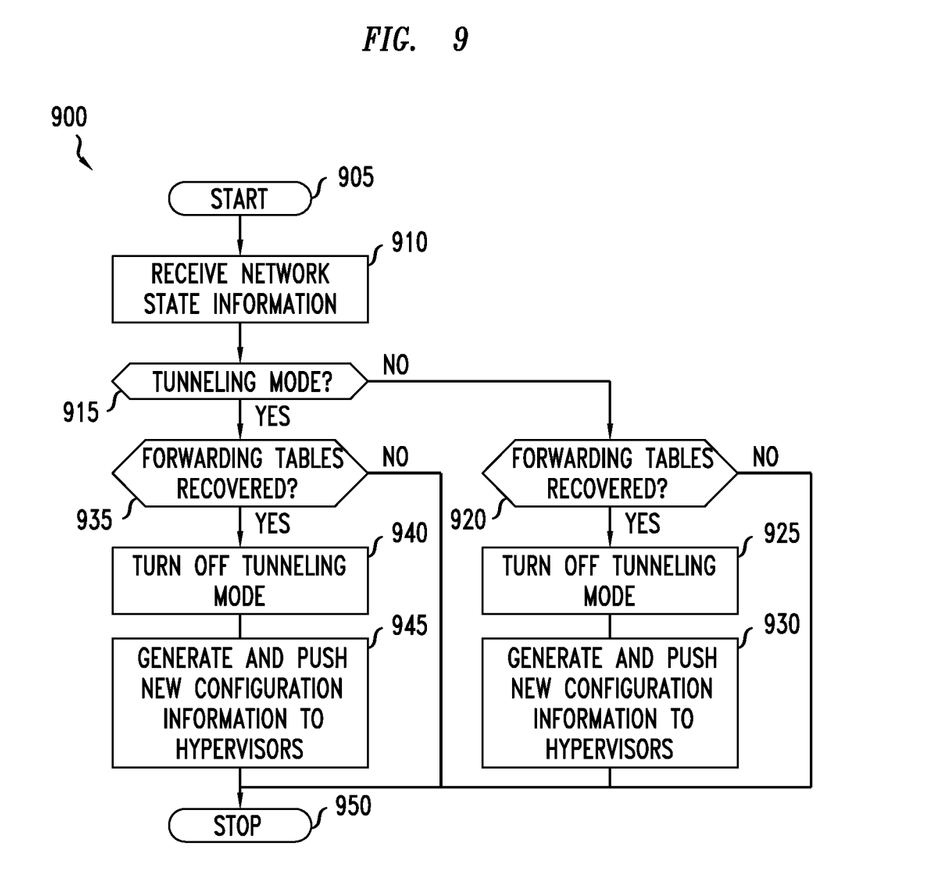
FIG. 9 illustrates an exemplary method for entering and exiting tunneling mode by an SDN controller.

FIG. 9 illustrates an exemplary method 900 for entering and exiting tunneling mode by an SDN controller such as, for example, the SDN controller 140 of FIG. 1. The method 900 begins in step 905 and proceeds to step 910 where the SDN controller received information describing the network state. For example, the SDN controller may receive an indication of the size of the per-endpoint state information table stored in one or more core node or a simple notification that such size has exceeded or fallen below a threshold. In step 915, SDN controller determines whether tunneling mode is currently enabled for the network.

If tunneling mode is not currently enabled, the SDN controller determines in step 920 whether the forwarding tables of the core nodes are overloaded. For example, if a reported state information table size exceeds a threshold, if the core nodes reported exceeding the threshold, or if the number of flows or known endpoints in the system exceed a threshold, the SDN controller determines that the forwarding tables are overloaded. If so, the SDN controller turns on tunneling mode for the network in step 925 and proceeds to generate and push new configuration information for each active flow, such that the hypervisor edge switches are configured to begin encapsulating outgoing frames and decapsulating incoming frames. The method then proceeds to end in step 950.

If, on the other hand, tunneling mode is currently enabled in step 915, the SDN controller determines in step 935 whether the forwarding tables have recovered. For example, the SDN controller may determine whether the forwarding table sizes have fallen below a threshold, if the core nodes have reported such a falling below the threshold, or if the number of flows or known endpoints in the system have fallen below a threshold, the SDN controller may determine that the forwarding tables have recovered. If so, the SDN controller proceeds to turns off tunneling mode for the network in step 940 and proceeds to generate and push new configuration information for each active flow, such that the hypervisor edge switches are configured to not perform and encapsulation or decapsulation of frames. The method then proceeds to end in step 950.

Various extensions and modifications to the above described systems and methods will be apparent. For example, in various embodiments, the SDN controller or hypervisor edge switches may perform periodic "cleanup operations" to remove stale configurations for flows that have ended. As another alternative, rather than pushing new configuration information to the hypervisor edge switches in steps 930 or 940, the SDN controller may simply configure any new flows according to whether tunneling mode is enabled or disabled at the time the new flow is established.

According to the foregoing, various embodiments enable the use of native VLANs for traffic path optimization within cloud networks and other highly scalable networks. For example, by utilizing SDN control of hypervisor edge switches or other edge devices, per-tenant isolation of traffic can be achieved outside of the VLAN functionality. At the same time, VLANs may be dynamically assigned to each new flow from a pool of available VLANs to provide for a more evenly distributed utilization of the core network. Various additional benefits will be apparent in view of the foregoing.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable storage medium encoded with instructions for execution by a software-defined network (SDN) controller including a flow validator, the medium comprising:
   instructions for receiving a configuration request from an edge device, wherein the configuration request includes a determination whether frames from an end device belong to a traffic flow and identifies the traffic flow between at least two of the end devices other than the edge device;
   instructions for validating, by the flow validator in the SDN controller, whether the traffic flow is valid by extracting a flow identifier from the configuration request and comparing the flow identifier to destination addresses of each end device which are stored in a flow configuration storage the SDN controller to determine whether the traffic flow is valid;

instructions for assigning a virtual local area network (VLAN) identifier to the traffic flow when the traffic flow is valid; and instructions for configuring the edge device to add the assigned VLAN identifier to outgoing frames associated with the traffic flow, wherein the outgoing frames are frames that will be transmitted by the edge device to a core network.

2. The non-transitory machine-readable storage medium of claim 1, further comprising:

instructions for configuring, in response to assigning the VLAN identifier, at least one additional edge device to remove the VLAN identifier from incoming frames associated with the traffic flow, wherein the incoming frames are frames that have traversed at least one core node of the core network.

3. The non-transitory machine-readable storage medium of claim 1, wherein the edge device is a hypervisor edge switch running on a server and a first end device of the at least two end devices is a virtual machine running on the server.

4. The non-transitory machine-readable storage medium of claim 1, wherein the instructions for assigning a virtual local area network (VLAN) identifier to the traffic flow comprise:

instructions for analyzing load placed on the core network by a plurality of traffic flows; and instructions for selecting a VLAN based on the analyzed load on the core network.

5. The non-transitory machine-readable storage medium of claim 4, wherein the instructions for selecting an unassigned VLAN based on the analyzed load on the core network comprise instructions for selecting a VLAN for which the traffic flow will utilize links in the core network that currently have lower utilization than other links in the core network.

6. The non-transitory machine-readable storage medium of claim 1, further comprising:

instructions for determining whether the at least two end devices belong to the same tenant; and instructions for configuring the edge device to drop the traffic flow when the at least two end devices do not belong to the same tenant, wherein the instructions for assigning a virtual local area network (VLAN) identifier to the traffic flow are configured for execution based on the at least two end devices belonging to the same tenant.

7. The non-transitory machine-readable storage medium of claim 1, further comprising:

instructions for determining, based on an amount of endpoint state information stored in at least one core device of the core network, that the software-defined network will enter an encapsulation mode; and instructions for configuring the edge device to encapsulate outgoing frames associated with the traffic flow to produce encapsulated outgoing frames that are destined for at least an additional edge device and are tagged with the VLAN identifier.

8. A software-defined network controller comprising:
a network interface;
a flow validator; a memory; and
a processor in communication with the network interface and the memory, the processor being configured to:

receive, via the network interface, a configuration request from an edge device, wherein the configuration request includes a determination whether frames from an end device belong to a traffic flow and identifies the traffic flow between at least two of the end devices other than the edge device, validate, by the flow validator in the SDN controller, whether the traffic flow is valid by extracting a flow identifier from the configuration request and comparing the flow identifier to destination addresses of each end device which are stored in a flow configuration storage in the SDN controller to determine whether the traffic flow is valid;

assign a virtual local area network (VLAN) identifier to the traffic flow when the traffic flow is valid, and configure the edge device to add the assigned VLAN identifier to outgoing frames associated with the traffic flow, wherein the outgoing frames are frames that will be transmitted to a core network.

9. The software-defined network controller of claim 8, wherein the processor is further configured to:

configure, in response to assigning the VLAN identifier, at least one additional edge device to remove the VLAN identifier from incoming frames associated with the traffic flow, wherein the incoming frames are frames that have traversed at least one core node of the core network.

10. The software-defined network controller of claim 8, wherein the edge device is a hypervisor edge switch running on a server and a first end device of the at least two end devices is a virtual machine running on the server.

11. The software-defined network controller of claim 8, wherein, in assigning a virtual local area network (VLAN) identifier to the traffic flow, the processor is configured to:

analyze load placed on the core network by a plurality of assigned VLANs; and select an unassigned VLAN based on the analyzed load on the core network.

12. The software-defined network controller of claim 11, wherein, in selecting an unassigned VLAN based on the analyzed load on the core network, the processor is configured to select a VLAN for which the traffic flow will utilize links in the core network that currently have lower utilization than other links in the core network.

13. The software-defined network controller of claim 8, wherein the processor is further configured to:

determine whether the at least two end devices belong to the same tenant; and configure the edge device to drop the traffic flow when the at least two end devices do not belong to the same tenant, wherein the process is configured to perform the assigning a virtual local area network (VLAN) identifier to the traffic flow are configured for execution based on the at least two end devices belonging to the same tenant.

14. The software-defined network controller of claim 8, wherein the processor is further configured to:

determine, based on an amount of endpoint state information stored in at least one core device of the core network, that the software-defined network will enter an encapsulation mode; and configure the edge device to encapsulate outgoing frames associated with the traffic flow to produce encapsulated outgoing frames that are destined for at least an additional edge device and are tagged with the VLAN identifier.

15. A method performed by a software-defined network controller including a flow validator, the method comprising:
receiving a configuration request from an edge device, wherein the configuration request includes a determination whether frames from an end device belong to a traffic flow and identifies the traffic flow between at least two of the end devices other than the edge device;
validating, by the flow validator in the SDN controller, whether the traffic flow is valid by extracting a flow identifier from the configuration request and comparing the flow identifier to destination addresses of each end device which are stored in a flow configuration storage in the SDN controller to determine whether the traffic flow is valid;
assigning, by the software-defined network controller, a virtual local area network (VLAN) identifier to the traffic flow when the traffic flow is valid; and
configuring the edge device to add the assigned VLAN identifier to outgoing frames associated with the traffic flow, wherein the outgoing frames are frames that will be transmitted to a core network.

16. The method of claim 15, further comprising:
configuring, in response to assigning the VLAN identifier, at least one additional edge device to remove the VLAN identifier from incoming frames associated with the traffic flow, wherein the incoming frames are frames that have traversed at least one core node of the core network.

17. The method of claim 15, wherein the edge device is a hypervisor edge switch running on a server and a first end device of the at least two end devices is a virtual machine running on the server.

18. The method of claim 15, wherein assigning a virtual local area network (VLAN) identifier to the traffic flow comprises:
analyzing load placed on the core network by a plurality of assigned VLANs; and
selecting an unassigned VLAN based on the analyzed load on the core network.

19. The method of claim 15, further comprising:
determining whether the at least two end devices belong to the same tenant; and
configuring the edge device to drop the traffic flow when the at least two end devices do not belong to the same tenant,
wherein the step of assigning a virtual local area network (VLAN) identifier to the traffic flow is performed based on the at least two end devices belonging to the same tenant.

20. The method of claim 15, further comprising
determining, based on an amount of endpoint state information stored in at least one core device of the core network, that the software-defined network will enter an encapsulation mode; and
configuring the edge device to encapsulate outgoing frames associated with the traffic flow to produce encapsulated outgoing frames that are destined for at least an additional edge device and are tagged with the VLAN identifier.

21. A machine-readable storage medium encoded with instructions for execution by a software-defined network (SDN) controller, the medium comprising:
instructions for receiving a first configuration request from an edge device, wherein the configuration request includes a determination whether frames from an end device belong to a traffic flow and includes an address and identifies a first traffic flow between at least two of the end devices other than the edge device;
instructions for identifying an address conflict comprising:
instructions for validating, by the flow validator in the SDN controller, whether the traffic flow is valid by extracting a flow identifier from the configuration request and comparing the flow identifier to destination addresses of each end device which are stored in a flow configuration storage in the SDN controller to determine whether the traffic flow is valid;
instructions for identifying a previously-configured second traffic flow also utilizing the address, and instructions for determining that the first traffic flow and the second traffic flow belong to different cloud tenants; and
instructions for configuring the edge device to perform address translation on outgoing frames to replace the address with an alternative address, wherein the outgoing frames are frames that will be transmitted by the edge device to a core network.

22. The non-transitory machine-readable storage medium of claim 21, further comprising:
instructions for configuring, in response to identifying an address conflict, at least one additional edge device to perform address translation on incoming frames to replace the alternative address with the address that was previously removed, wherein the incoming frames are frames that have traversed at least one core node of the core network.

23. The non-transitory machine-readable storage medium of claim 21, wherein the address and the alternative address are media access control (MAC) addresses.

24. The non-transitory machine-readable storage medium of claim 21, wherein the address and the alternative address are IP addresses associated with multicast traffic.

25. The non-transitory machine-readable storage medium of claim 21, wherein the edge device is a hypervisor edge switch and at least one of the edge devices is a virtual machine executing on the same hardware as the hypervisor edge switch.

26. The non-transitory machine-readable storage medium of claim 21, further comprising instructions for configuring the edge device to perform Internet group management protocol (IGMP) snooping and to forward an IGMP multicast address to the SDN controller as part of the first flow identification.

27. The non-transitory machine-readable storage medium of claim 21, further comprising:
instructions for assigning a first VLAN identifier to the first flow; and
instructions for configuring the edge device to add the VLAN identifier to the outgoing frames.

* * * * *